US008970988B1

United States Patent
Li et al.

(10) Patent No.: US 8,970,988 B1
(45) Date of Patent: Mar. 3, 2015

(54) ELECTRIC GAPS AND METHOD FOR MAKING ELECTRIC GAPS FOR MULTIPLE SENSOR ARRAYS

(71) Applicant: Western Digital (Fremont), LLC, Fremont, CA (US)

(72) Inventors: Shaoping Li, San Ramon, CA (US); Gerardo A. Bertero, Redwood City, CA (US); Changhe Shang, Fremont, CA (US); Ge Yi, San Ramon, CA (US); Steven C. Rudy, San Jose, CA (US); Guolun Hao, Dublin, CA (US); Qunwen Leng, Palo Alto, CA (US); Shihai He, Fremont, CA (US); Yingbo Zhang, San Ramon, CA (US); Ming Mao, Dublin, CA (US); Lien-Chang Wang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/253,358

(22) Filed: Apr. 15, 2014

Related U.S. Application Data

(60) Provisional application No. 61/922,352, filed on Dec. 31, 2013.

(51) Int. Cl.
*G11B 5/48* (2006.01)
*G11B 5/265* (2006.01)

(52) U.S. Cl.
CPC .................................. *G11B 5/2652* (2013.01)
USPC ....................................................... 360/235.4

(58) Field of Classification Search
USPC ............. 360/235.1–235.9; 29/603.12, 603.16
See application file for complete search history.

(56) References Cited

U.S. PATENT DOCUMENTS

| | | | |
|---|---|---|---|
| 3,780,266 A | 12/1973 | Mudsam et al. |
| 4,012,781 A | 3/1977 | Lin |
| 4,597,023 A | 6/1986 | Rijckaert |
| 5,229,901 A | 7/1993 | Mallary |
| 5,270,892 A | 12/1993 | Naberhuis |
| 5,309,305 A | 5/1994 | Nepela et al. |
| 5,321,557 A | 6/1994 | Shimotashiro et al. |
| 5,353,176 A | 10/1994 | Kosuge |
| 5,388,014 A | 2/1995 | Brug et al. |
| 5,508,868 A | 4/1996 | Cheng et al. |
| 5,523,904 A | 6/1996 | Saliba |

(Continued)

OTHER PUBLICATIONS

Shaoping Li, et al., U.S. Appl. No. 13/928,799, filed Jun. 27, 2013, 27 pages.

(Continued)

*Primary Examiner* — Allen T Cao

(57) ABSTRACT

A method and system provide a magnetic transducer having an air-bearing surface (ABS) and at least two read sensors. The magnetic transducer also includes a first read shield, a first read sensor, a middle shield, a second read sensor, a second read shield, a first electric gap and a second electric gap. The first read sensor is in a down track direction from the first read shield. The middle shield is in a down track direction from the first read sensor. The middle shield is between the first read sensor and the second read sensor. A first portion of the first electric gap is in a direction opposite to the down track direction from the first read sensor. The first read sensor and the second read sensor are between the first electric gap and the second electric gap in a cross-track direction.

22 Claims, 10 Drawing Sheets

(56) References Cited

U.S. PATENT DOCUMENTS

| | | |
|---|---|---|
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,071,007 A | 6/2000 | Schaenzer et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,104,562 A | 8/2000 | Ottesen et al. |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,154,335 A | 11/2000 | Smith et al. |
| 6,157,510 A | 12/2000 | Schreck et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,191,925 B1 | 2/2001 | Watson |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,216,242 B1 | 4/2001 | Schaenzer |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,998 B1 | 8/2001 | Coehoorn et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,311,551 B1 | 11/2001 | Boutaghou |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,341,102 B1 | 1/2002 | Sato et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,982 B2 | 4/2002 | Saliba |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,449,131 B2 | 9/2002 | Guo et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,541 B1 | 10/2002 | Wang et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |

(56) References Cited

U.S. PATENT DOCUMENTS

| | | |
|---|---|---|
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,333 B1 | 12/2002 | Han et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,674,618 B2 | 1/2004 | Engel et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,842,312 B1 | 1/2005 | Alstrin et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,247 B2 | 9/2005 | Schwarz et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,995,957 B2 | 2/2006 | Jayasekara |
| 7,002,777 B2 | 2/2006 | Ogawa et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,549 B2 | 9/2006 | Asakura |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,807 B1 | 3/2007 | Liikanen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |

(56) References Cited

U.S. PATENT DOCUMENTS

| | | |
|---|---|---|
| 7,212,384 B1 | 5/2007 | Stoev et al. |
| 7,215,514 B1 | 5/2007 | Yang et al. |
| 7,238,292 B1 | 7/2007 | He et al. |
| 7,239,465 B1 | 7/2007 | Watson et al. |
| 7,239,478 B1 | 7/2007 | Sin et al. |
| 7,242,547 B2 | 7/2007 | Ogawa |
| 7,248,431 B1 | 7/2007 | Liu et al. |
| 7,248,433 B1 | 7/2007 | Stoev et al. |
| 7,248,449 B1 | 7/2007 | Seagle |
| 7,259,927 B2 | 8/2007 | Harris |
| 7,271,970 B2 | 9/2007 | Tsuchiya |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,405,907 B2 | 7/2008 | Raastad |
| 7,408,730 B2 | 8/2008 | Yamagishi |
| 7,417,832 B1 | 8/2008 | Erickson et al. |
| 7,419,891 B1 | 9/2008 | Chen et al. |
| 7,420,758 B2 | 9/2008 | Inoue et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,632 B2 | 10/2008 | Li et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,502,193 B2 | 3/2009 | Albrecht et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,619,194 B2 * | 11/2009 | Kobashi ........................ 250/205 |
| 7,639,457 B1 | 12/2009 | Chen et al. |
| 7,652,847 B2 | 1/2010 | Weiss et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,755,863 B2 | 7/2010 | Neumann et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,009,388 B2 | 8/2011 | Oh et al. |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,301 B1 | 3/2012 | Li et al. |
| 8,141,235 B1 | 3/2012 | Zhang |
| 8,144,424 B2 | 3/2012 | Dugas et al. |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,228 B2 | 6/2012 | Maat et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |

(56) References Cited

U.S. PATENT DOCUMENTS

| | | |
|---|---|---|
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,295,006 B2 * | 10/2012 | Sugano et al. ............... 360/112 |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,508 B1 | 12/2013 | Burd |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |

(56) References Cited

U.S. PATENT DOCUMENTS

| | | |
|---|---|---|
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,861,136 B2 * | 10/2014 | Sasaki et al. ............... 360/125.3 |
| 2004/0184181 A1 | 9/2004 | Fukuda et al. |
| 2005/0036241 A1 | 2/2005 | Tsuda et al. |
| 2005/0036437 A1 | 2/2005 | Learned et al. |
| 2005/0088787 A1 * | 4/2005 | Takahashi et al. ......... 360/324.2 |
| 2007/0242378 A1 | 10/2007 | Ikegami et al. |
| 2008/0203279 A1 * | 8/2008 | Kobashi ....................... 250/216 |
| 2010/0020435 A1 | 1/2010 | Chen et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0282492 A1 | 11/2012 | Sasaki et al. |
| 2012/0298621 A1 | 11/2012 | Gao |
| 2012/0307404 A1 * | 12/2012 | Braganca et al. .......... 360/245.8 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0286502 A1 | 10/2013 | Erden et al. |
| 2014/0154529 A1 | 6/2014 | Yang et al. |
| 2014/0160590 A1 | 6/2014 | Sankaranarayanan et al. |
| 2014/0175050 A1 | 6/2014 | Zhang et al. |

OTHER PUBLICATIONS

Donald Brunnett, et al., U.S. Appl. No. 14/203,358, filed Mar. 10, 2014, 11 pages.

Shaoping Li, et al., U.S. Appl. No. 14/097,157, filed Dec. 4, 2013, 38 pages.

Michael L. Mallary, et al., U.S. Appl. No. 14/099,849, filed Dec. 6, 2013, 15 pages.

* cited by examiner

ELECTRIC GAPS AND METHOD FOR MAKING ELECTRIC GAPS FOR MULTIPLE SENSOR ARRAYS

CROSS-REFERENCE TO RELATED APPLICATIONS

This application claims priority to provisional U.S. Patent Application Ser. No. 61/922,352, filed on Dec. 31, 2013, which is hereby incorporated by reference in its entirety.

BACKGROUND

FIG. 1 depicts an air-bearing surface (ABS) view of a conventional read transducer 10. The conventional read transducer 10 includes shields 12 and 20, sensor 14, magnetic bias structures 16 and conventional electric gaps 22. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures. These magnetic bias structures are used to magnetically bias the sensor layer of the sensor 14.

The electric gaps 22 are used to electrically isolate the read sensor 14. Typically, the conventional electric gaps are formed after the read sensor 14 and magnetic bias structure have been formed and the conventional transducer 10 has been planarized. After the chemical mechanical planarization (CMP) or analogous planarization step, the conventional electric gaps 22 are formed. The shield 20 may then be deposited.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction. The central sensor reads the data from a track of interest, while the outer sensors sense the data in adjacent tracks in order to account for noise.

Although TDMR might be capable of higher recording densities, issues may complicate fabrication of a read transducer or adversely affect its performance. Fabrication of an additional read sensor above the read sensor 14 shown, in place of the shield 20, may be complicated. Such a read sensor would be desired to be electrically isolated from the read sensor 14. However, the conventional electric gaps 22 do not allow for a flat topology. If the electric gaps are omitted, electrical insulation may be insufficient. If the additional read sensor is fabricated above the tops of the electric gaps 22, too large a space may be between the read sensors. Consequently, a transducer suitable for use in TDMR and which may be relatively simply fabricated is desired.

DETAILED DESCRIPTION OF THE EXEMPLARY EMBODIMENTS

Figure 1:
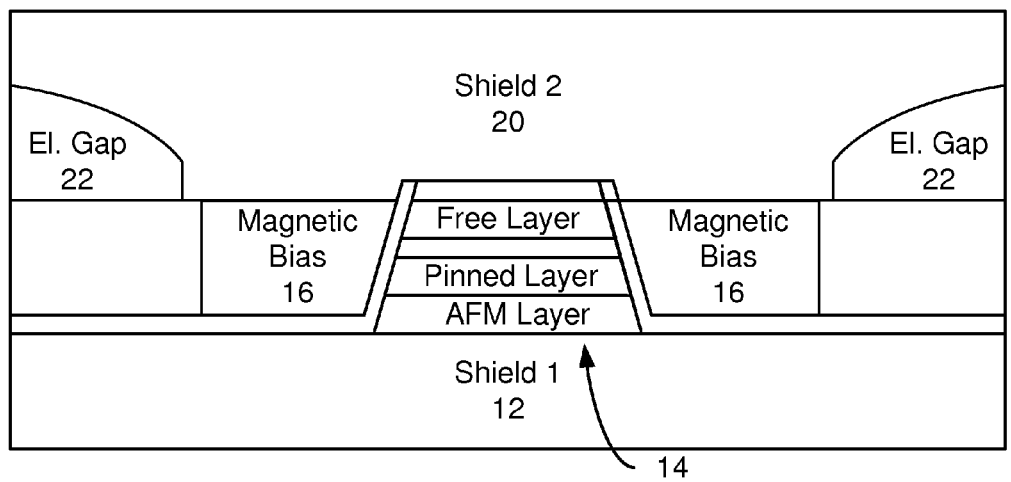
FIG. 1 depicts a conventional read transducer.
Figure 2:
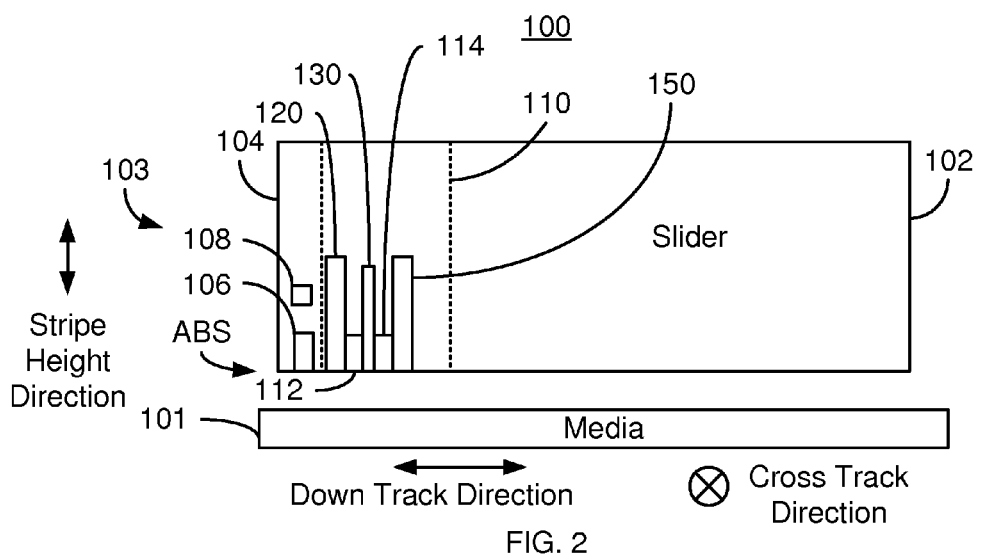
FIG. 2 depicts an exemplary embodiment of a disk drive.

FIG. 2 depicts a side view of a disk drive 100. For clarity, FIG. 2 is not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present. The read transducer 110 includes multiple read sensors 112 and 114, read shields 120 and 150 and middle shield 130. In the embodiment shown, the read sensor 112 and 114 are self-aligned in the down track direction of the transducer 110.

Figure 3A:
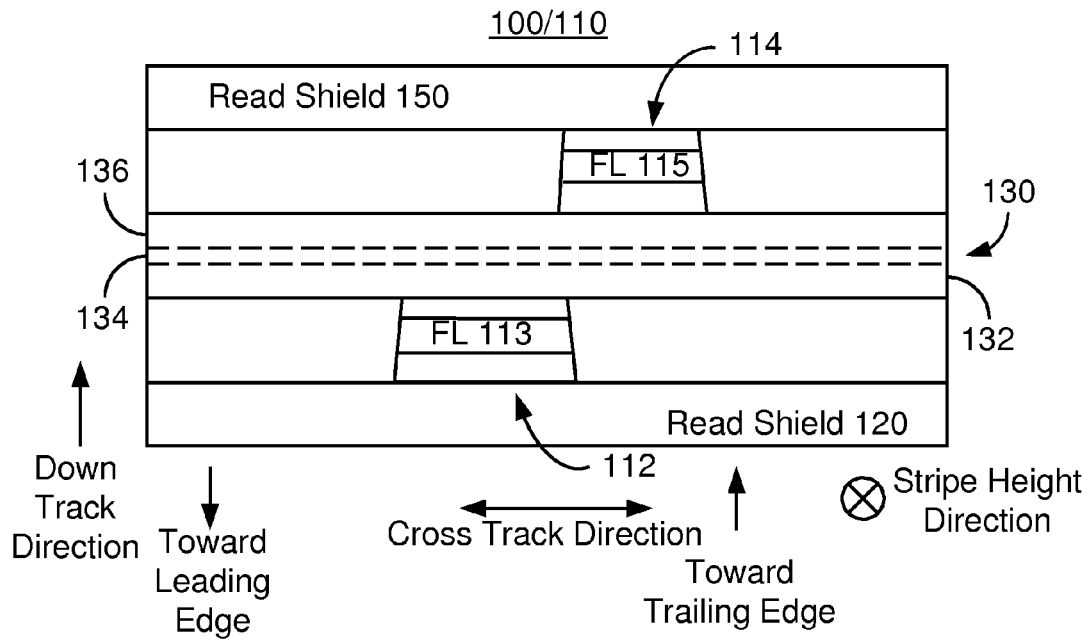
FIGS. 3A-3B depict an ABS view of an exemplary embodiment of a portion of a magnetic recording read transducer.
Figure 3B:
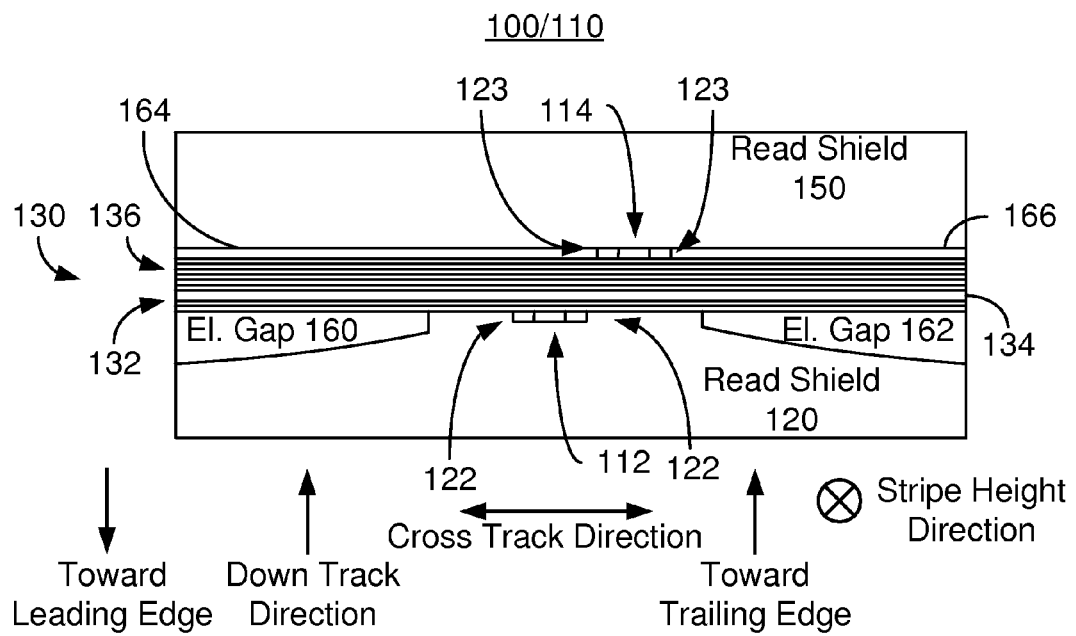

FIGS. 3A and 3B depict a close-up ABS view of the transducer 110 of the disk drive 100 and a further-away ABS view of the transducer 110. For clarity, FIGS. 3A and 3B are not to scale. For simplicity not all portions of the disk drive 100 are shown. The transducer 110 and disk drive 100 depicted in FIGS. 3A and 3B are analogous to the read transducer 110 and disk drive 100 depicted in FIG. 2. Consequently, analogous components have similar labels. For simplicity, only a portion of the transducer 110 and disk drive 100 are shown in FIGS. 3A-3B.

Referring to FIGS. 2, 3A and 3B, the read transducer 110 includes multiple read sensors 112 and 114 having sensor layers 113 and 115, respectively, that may be free layers in a giant magnetoresistive (GMR) sensor or a tunneling magnetoresistive (TMR) sensor. Thus, each sensor 112 and 114 may include a pinning layer, a pinned layer and a nonmagnetic spacer layer in addition to the free layer 113 and 115, respectively. For simplicity, only the free layers 113 and 115 are separately labeled in FIGS. 3A-3B. The sensors 112 and 114 may also include other layers such as seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113 and 115 are each shown as a single layer, but may include multiple layers including but not limited to a synthetic antiferromagnetic (SAF) structure. The pinned layer may also be a simple layer or a multilayer. Although shown as extending the same distance from the ABS in FIG. 2, the pinned layer may extend further than the corresponding free layer 113 and/or 115. The nonmagnetic spacer layer may be a conductive layer, a tunneling barrier layer, or other analogous layer. Although depicted as a GMR or TMR sensor, in other embodiments, other structures and other sensing mechanisms may be used for the sensor. Also shown in FIG. 3B are the electric gaps 160 and 162.

The read sensors 112 and 114 may have different widths in the track width, or cross-track, direction. However, in other embodiments, the widths of the sensors 112 and 114 may be the same. The widths of the sensors 112, 114 and 116 may also be based on the track pitch. The track pitch is the distance from the center of one track to the center of the next track. Further, the widths may depend not only on the track pitch, but also on the distance between the sensors 112 and 114. In the embodiment shown, the read sensors 112 and 114 are offset in the cross track direction. Therefore, the centers of each of the read sensors 112 and 114 are not aligned along a line that runs the down track direction. Stated differently, the centers of the read sensors 112 and 114 are separated in the cross-track direction. The read sensor 114 is also in a down track direction from the read sensor 112. The read sensor 114 is thus closer to the trailing edge of the slider 102 than the read sensor 112 is. Conversely, the read sensor 112 is in a direction opposite to the down track direction from the read sensor 114. The read sensor 112 is thus closer to the leading edge of the slider 102 than the read sensor 114. The down track direction, cross track direction and stripe height direction are thus shown in FIGS. 3A and 3B.

Also shown are bias structures 122 and 123 that magnetically bias the read sensors 112 and 114, respectively. The magnetic bias structure(s) 122 and/or 123 may be soft bias structures fabricated with soft magnetic material(s). In other embodiments, the magnetic bias structure(s) 122 and/or 123 may be hard magnetic bias structures. Other mechanisms for biasing the sensors 112, and 114 might also be used.

The read sensors 112 and 114 are separated by middle shield 130. The read sensors 112 and 114 and shield 130 are surrounded by read shields 120 and 150. Thus, as used herein, a middle shield may be considered to be an internal shield, which is interleaved with read sensors 112 and 114 and between the outer, read shields 120 and 150. The outermost shields for the read transducer 110 are termed read shields. The middle shield 130 is in the down track direction from the read sensor 112 and in the opposite direction from the down track direction from read sensor 114. In the embodiment shown in FIGS. 2, 3A and 3B, there are two read sensors 112 and 114 and one middle shield 130. However, in another embodiment, another number of read sensors and middle/internal shields may be present. The middle shield/read shields 120, 130 and 150 generally include soft magnetic material. In some embodiments, one or more of the shields 120, 130 and 150 may include ferromagnetic layers that are antiferromagnetically coupled. For example, the middle shield 130 is depicted as including conductive shield layers 132 and 136 separated by insulating layer 134. As can be seen in FIG. 3B, each of the shield layers 132 and 136 may be a multilayer. Although not shown as such, the insulating layer 134 may be an insulator or a conductor.

In operation, current is driven perpendicular-to-plane for the sensors 112 and 114. Thus, current is driven through the sensor 112 between the shields 120 and 130. Similarly, current is driven through the sensor 114 between the shields 130 and 150. Thus, electrical connection is to be made to the shields 120, 130 and 150. However, different currents may be desired to be driven through the sensors 112 and 114. Similarly, the resistances of the sensors 112 and 114 may be desired to be separately sensed. For example, the sensors 112 and 114 may each be desired to be separately coupled to their own preamplifier (preamp). As a result, the sensors 112 and 114 are desired to be electrically isolated from each other. Consequently, the middle shield 130 may be configured to not only magnetically shield the sensors 112 and 114, but also to provide electrical isolation. As a result, the shield 130 may include the insulating layer 134. However, in other embodiments, the shield 130 may be a monolithic structure.

Electric gaps 160 and 162 and thin electric gaps 164 and 166 are used to electrically insulate the sensor 112 and read shield 120 from other layers such as the read shield 150 and shield layer 136. The electric gaps 160, 162, 164 and 166 also prevent current from shunting away from the sensors 112 and 114. In an alternate embodiment, one or more of the electric gaps 160, 162, 164 and/or 166 might be omitted. In addition, the electric gaps 160 and 162 are shown as being substantially the same. Thus, the gaps 160 and 162 and shields 120, 130 and 140 are symmetric with respect to a line drawn through the center of the middle shield 130 in either the down track or the cross track direction. In other embodiments, the gaps 160, 162, 164 and 166 may not be symmetric. For example, the locations of gaps 162 and 166 may be switched. The electric gaps 160 and 162 include insulating material(s) such as aluminum oxide and/or silicon oxide. In some embodiments, the electric gaps 160 and 162 are at least one hundred fifty nanometers thick at their thickest portions. In some embodiments, the thickness is at least two hundred nanometers. At their edges (thinnest regions), the electric gaps 160 and 162 may be not substantially thicker than the read sensor 112. In other embodiments, the electric gaps 160 and 162 may have other thicknesses. The electric gaps 160 and 162 may also be used to reduce the capacitance of the transducer 110. Further, as can be seen in FIG. 3B, a portion of each of the electric gaps 160 and 162 is in a direction opposite to the down track direction from the read sensor 112. In other words, the electric gaps 160 and 162 extend further down the page (toward the leading edge of the slider 102) than the read sensor 112. As a result, the insulation between the shields 120 and 150 may be increased.

On the other hand, the electric gaps 160 and 162 do not extend significantly further in the down track direction than the read sensor 112. The surface formed at least in part by the down track surfaces of the electric gaps 160 and 162, the read sensor 112 and the bias structures 122 is thus substantially flat. In some embodiments, therefore, the middle shield 130 has a substantially flat bottom/leading edge surface. At least in part because of the configuration of the electric gaps 160 and 162, the surface of the middle shield closest to the leading edge is substantially flat. In some embodiments, the surface of the middle shield 130 closest to the trailing edge is also substantially flat.

The magnetic read transducer 110 and disk drive 100 may have improved performance and manufacturability. The thickness and insulating ability of the electric gaps 160 and 162 may be maintained. The sensors 112 and 114 may be separated by a relatively small distance corresponding to the thickness of the middle shield 130. As a result, the capacitances between the sensors 112 and 114 may be reduced. The magnetic transducer 110 may then be used at higher data rates in TDMR. In addition, the down track surface of the shield 130/shield layer 136 (the surface closest to the sensor 114)

may be substantially flat, even over the electric gaps 160 and 162. In some embodiments, the leading surface of the shield 130/shield layer 132 (the surface closest to the sensor 112) may also be substantially flat. Consequently, variations in topography due to fabrication of the sensor 112 may be reduced or eliminated. Fabrication of the sensor 114 may be facilitated. Performance and fabrication of the magnetic transducer 110 may, therefore, be improved.

Figure 4:
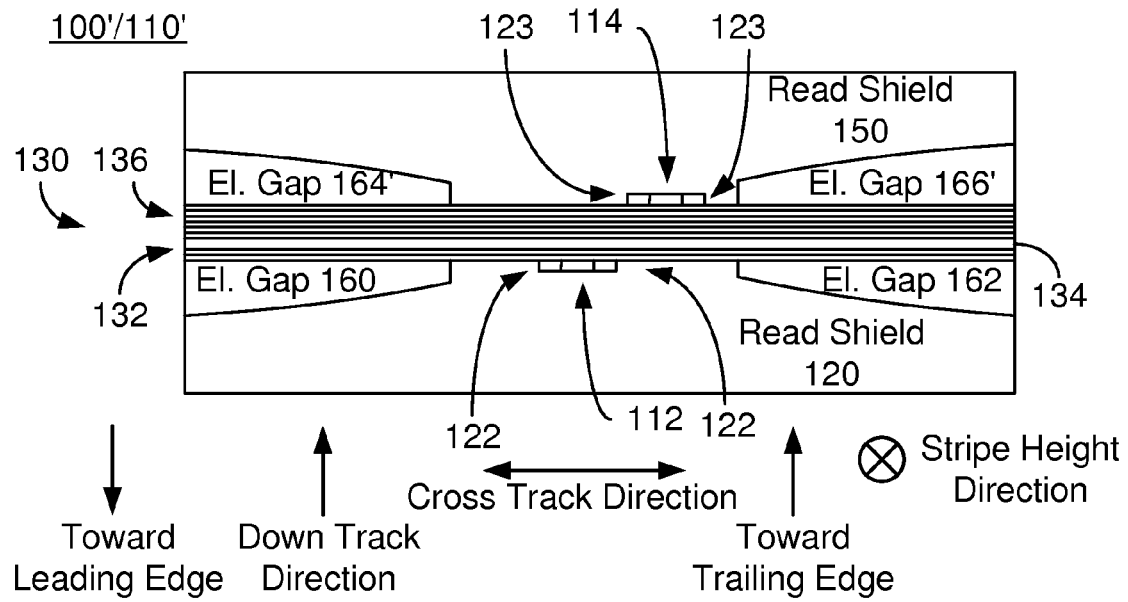
FIG. 4 depicts an ABS view of another exemplary embodiment of a portion of a magnetic recording read transducer.

FIG. 4 depicts an ABS view of an exemplary embodiment of a transducer 110' that is part of a disk drive 100'. For clarity, FIG. 4 is not to scale. For simplicity not all portions of the disk drive 100' and transducer 110' are shown. The transducer 110' and disk drive 100' depicted in FIG. 4 are analogous to the read transducer 110 and disk drive 100 depicted in FIGS. 2-3B. Consequently, analogous components have similar labels. For simplicity, only a portion of the transducer 110' and disk drive 100' are shown in FIGS. 3A-3B.

The transducer 110' includes read shields 120 and 150, read sensors 112 and 114, magnetic bias structures 122 and 123, and middle shield 130 including layers 132, 134 and 136 that are analogous to the read shields 120 and 150, read sensors 112 and 114, magnetic bias structures 122 and 123, and middle shield 130 including layers 132, 134 and 136 depicted in FIGS. 2-3B, respectively. The transducer 110' thus operates in a similar manner to the transducer 110.

The transducer 110' includes electric gaps 160, 162, 164' and 166' that are analogous to the electric gaps 160, 162, 164 and 166, respectively, depicted in FIGS. 2-3B. Thus, the electric gaps 160, 162, 164' and 166' include insulating material(s) such as aluminum oxide and/or silicon oxide. In an alternate embodiment, one or more of the electric gaps 160, 162, 164' and/or 166' might be omitted.

The electric gaps 164' and 166' that are analogous to the electric gaps 164 and 166 in that the gaps 164' and 166' are in the down track direction from the middle shield 130. However, the configuration of the electric gaps 164' and 166' is more similar to that of the gaps 160 and 162. The electric gaps 164' and 166' are shown as being substantially the same. Thus, the gaps 164' and 166' and shields 120, 130 and 140 are symmetric with respect to a line drawn through the center of the middle shield 130 in either the down track or the cross track direction. However, symmetry is not required. In some embodiments, the electric gaps 164' and 166' are at least one hundred and fifty nanometers thick at their thickest portions. In some embodiments, the thickness is at least two hundred nanometers. At their edges (thinnest regions), the electric gaps 164' and 166' may be not substantially thicker than the read sensor 114. In other embodiments, the electric gaps 164' and 166' may have other thicknesses. The electric gaps 164' and 166' may also be used to reduce the capacitance of the transducer 110'. As can be seen in FIG. 4, a portion of each of the electric gaps 164' and 166' is in the down track direction from the read sensor 114. In other words, the electric gaps 164' and 166' extend further up the page (toward the trailing edge of the slider 102) than the read sensor 114. On the other hand, the electric gaps 164' and 166' do not extend significantly further in a direction opposite to the down track direction than the read sensor 114. The surface formed by the up track (closer toward the leading edge) surfaces of the electric gaps 164' and 166', the read sensor 114 and the bias structures 123 is thus substantially flat. The down track surfaces of the electric gaps 160 and 162, the read sensor 112 and the bias structures 122 may also be substantially flat. At least in part because of the configuration of the electric gaps 160, 162, 164' and 166', the top (trailing edge) and bottom (leading edge) surfaces of the middle shield 130 may be substantially flat.

The magnetic read transducer 110' and disk drive 100' may have improved performance. For example, the thickness of the electric gaps 160, 162, 164 and 166 may be relatively large. As a result, the capacitances between the sensors 112 and 114 may be reduced. The small distance between the sensors 112 and 114 may be maintained. The magnetic transducer 110' may then be used at higher data rates for TDMR. In addition, the surfaces of the shield 130 may be substantially flat, even between the electric gaps 160 and 164 and between the electric gaps 162 and 166. Consequently, variations in topography due to fabrication of the sensor 112 may be reduced or eliminated. Fabrication of the sensor 114 may be facilitated.

Figure 5:
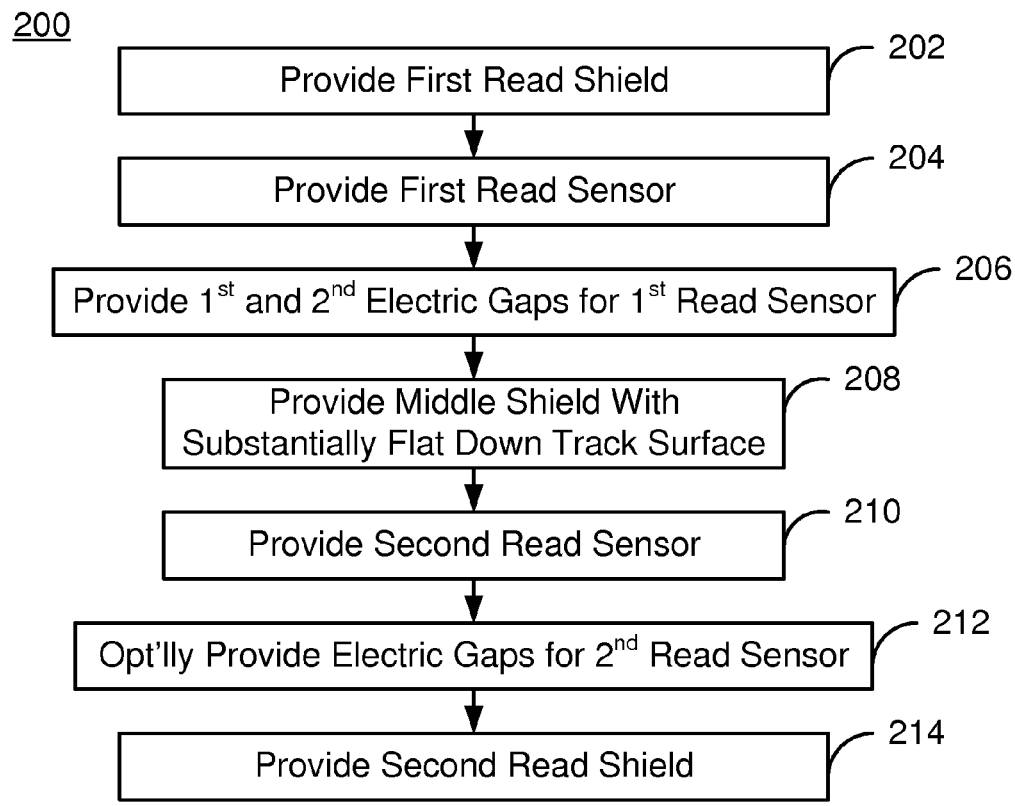
FIG. 5 is a flow chart depicting an exemplary embodiment of a method for fabricating a magnetic recording read transducer.

FIG. 5 is an exemplary embodiment of a method 200 for providing a read transducer having multiple sensors and electric gaps that may facilitate fabrication. For simplicity, some steps may be omitted, interleaved, and/or combined. The method 200 is also described in the context of providing a single recording transducer 110 or 110' depicted in FIGS. 2, 3A-3B and 4. However, the method 200 may be used to fabricate multiple transducers at substantially the same time. The method 200 may also be used to fabricate other transducers. The method 200 is also described in the context of particular layers. A particular layer may include multiple materials and/or multiple sub-layers. The method 200 also may start after formation of other portions of the magnetic recording transducer.

The first read shield 120 is provided, via step 202. Step 202 typically includes depositing (e.g. plating) a large high permeability layer. The layer may also be planarized. The first read sensor 114 is provided, via step 204. Step 204 may include full-film depositing an AFM layer, a pinned layer, a nonmagnetic spacer (e.g. tunneling barrier) layer and a free layer 113. The read sensor 112 is defined in step 204. Step 204 may define the read sensor 112 in the cross track and/or the stripe height direction. The stripe height direction is perpendicular to the ABS.

The first and second electric gaps 160 and 162 are provided, via step 206. Step 206 may be performed before or after formation of the read sensor 112. Step 206 may also be interleaved with various steps carried out in fabricating the read sensor 112. Because a portion of the electric gaps 160 and 162 are closer to the leading edge that the read sensor 112, step 206 may include removing a portion of the read shield 120. The material for the electric gaps 160 and 162 may be deposited in the trenches formed by the removal of the shield material. In some embodiments, the deposition may be carried out such that the top/down track surface of the electric gaps 160 is substantially the same as the top/down track surface of the sensor 112. In some such embodiments, a planarization such as a chemical mechanical planarization (CMP) may also be performed.

The middle shield 130 is provided on the first read sensor 112, via step 208. Step 208 may include depositing the shield layers 132 and 136 as well as the insulating layer 134. The shield 130 resides in a down track direction from the first read sensor 112 and, therefore, from the electric gaps 160 and 162. Because of the configuration of the electric gaps 160 and 162, the middle shield 130 has a substantially flat down track surface.

The second read sensor 114 may be provided, via step 210. Step 210 includes full-film depositing the layers for the read sensor 114 on the middle shield 130. The second read sensor 114 may also be defined in the cross track direction and/or the stripe height direction. The middle shield 130 is thus between the first read sensor 112 and the second read sensor 114 in the down track direction.

The electric gaps 164/164' and 166/166' may optionally be provided, via step 212. Step 212 may include covering the read sensor 114 with a mask and depositing the electric gaps 164/164' and 166/166'. Thus, the down track surface of the shield 130 may not be affected by formation of the electric gaps 164/164' and 166/166'. The second read shield 150 may be provided, via step 214. Step 214 typically includes depositing (e.g. plating) a large high permeability layer. The layer may also be planarized. Fabrication of the read transducer 110/110' may then be completed.

Using the method 200, the magnetic read transducer 110/110' and disk drive 110/100' may be provided. Because of the manner in which the electric gaps 160 and 162 are fabricated, a substantially flat surface is provided for fabrication of the read sensor 114. Processing may thus be simplified. The thickness of the electric gaps 160, 162, 164' and 166' may be sufficiently large that the capacitances between the sensors 112 and 114 may be reduced. The small distance between the sensors 112 and 114 may be maintained. Consequently, the simplification in processing may not adversely affect performance of the transducer 110/110'. The benefits of the transducers 110 and/or 110' may thus be achieved.

Figure 6:
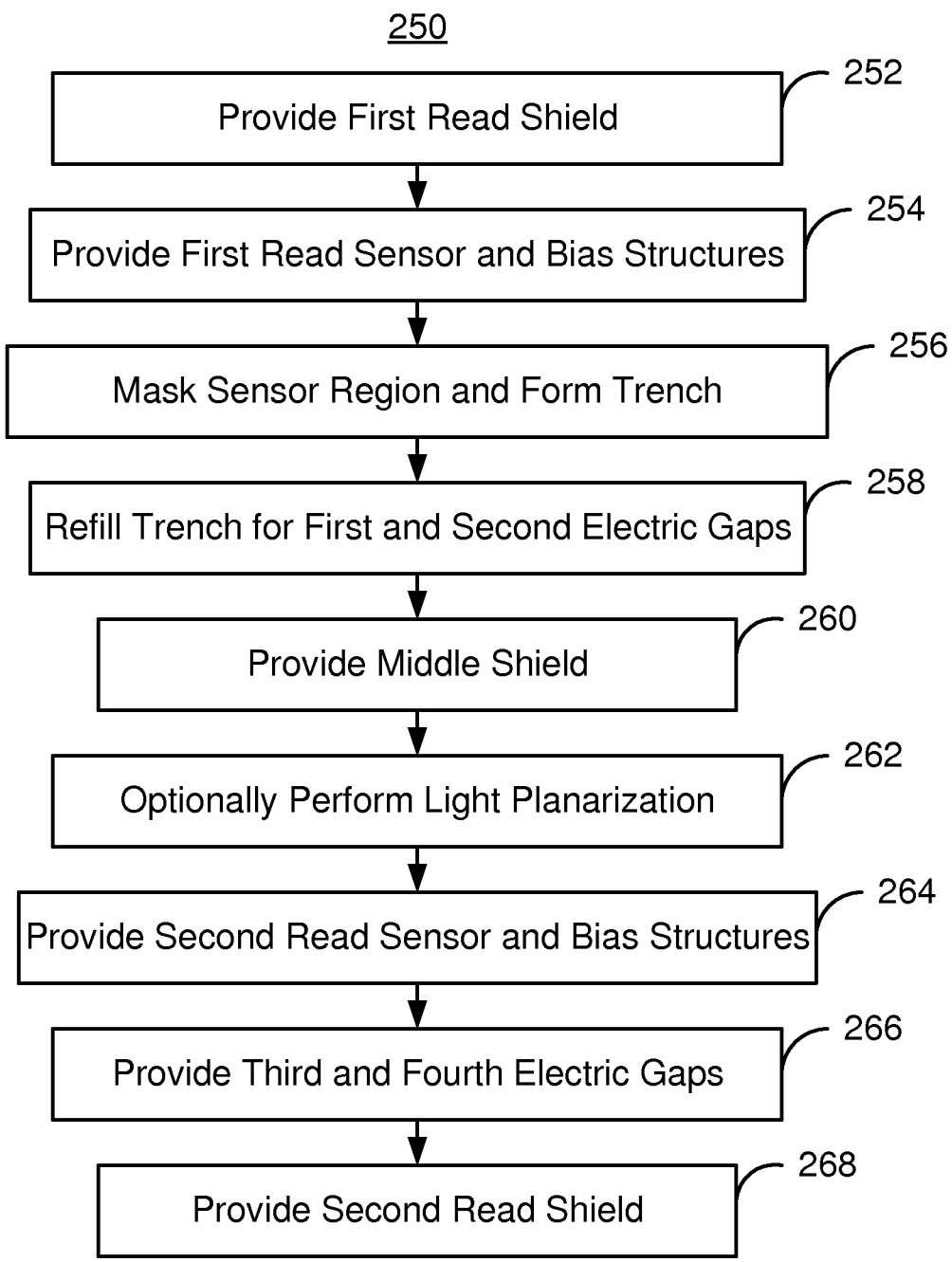
FIG. 6 is a flow chart depicting another exemplary embodiment of a method for fabricating a disk drive including a magnetic recording read transducer.

FIG. 6 is an exemplary embodiment of a method 250 for providing a read transducer having multiple sensors and electric gaps that may facilitate fabrication. For simplicity, some steps may be omitted, interleaved, and/or combined. FIGS. 7-14 depict ABS views of an exemplary embodiment of a transducer 300 that may be used in a magnetic disk drive during fabrication using the method 250. Such a disk drive may be analogous to the disk drive 100. For clarity, FIGS. 7-14 are not to scale and not all portions of the transducer 300 are shown. FIGS. 15-20 depict ABS views of an exemplary embodiment of a transducer 300' that may be used in a magnetic disk drive during fabrication using the method 250. Such a disk drive may be analogous to the disk drive 100. For clarity, FIGS. 15-20 are not to scale and not all portions of the transducer 300' are shown. The method 250 is first described in the context of providing a transducer 300 depicted in FIGS. 7-14. However, the method 250 may be used to fabricate multiple transducers at substantially the same time. The method 250 may also be used to fabricate other disk drives including but not limited to the disk drive 100 and transducers 110/110'. The method 250 is also described in the context of particular layers. A particular layer may include multiple materials and/or multiple sub-layers. The method 250 also may start after formation of other portions of the magnetic recording transducer.

Figure 7:
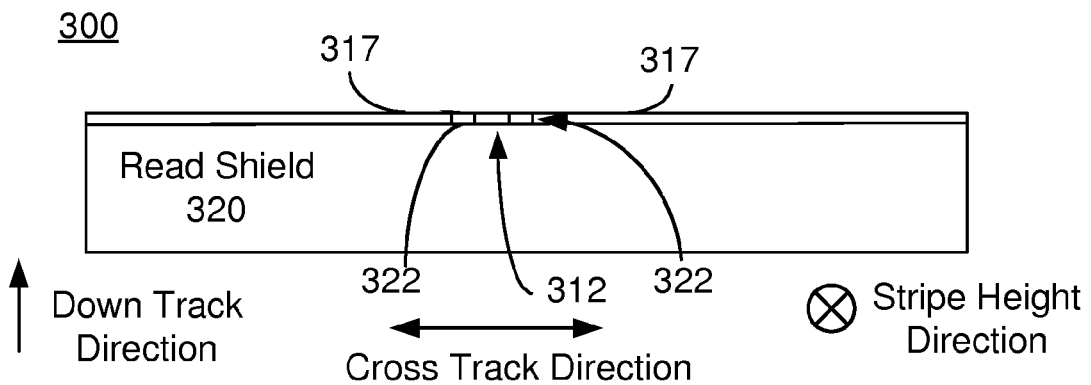
FIGS. 7-14 depict another exemplary embodiment of a portion of a magnetic recording read transducer and disk drive during fabrication.

The first read shield is provided, via step 252. Step 252 typically includes depositing (e.g. plating) a large high permeability layer. A CMP may also be performed to provide a flat surface for subsequent processing. The first read sensor and magnetic bias structures are provided, via step 254. Step 254 may include full-film depositing the layers for the first read sensor and defining the read sensor in at least the cross track direction. The magnetic bias structures may also be provided. In some embodiments, an insulating layer is provided between the sidewall of the read sensor and the bias structures. An insulating layer may adjoin the edges of the bias structures furthest from the sensor in the cross track direction. FIG. 7 depicts an ABS view of the transducer 300 after step 254 has been performed. A first read shield 320 formed in step 252 is depicted. Also shown is the read sensor 312, magnetic bias structures 322 and insulating layer 317.

Figure 8A:
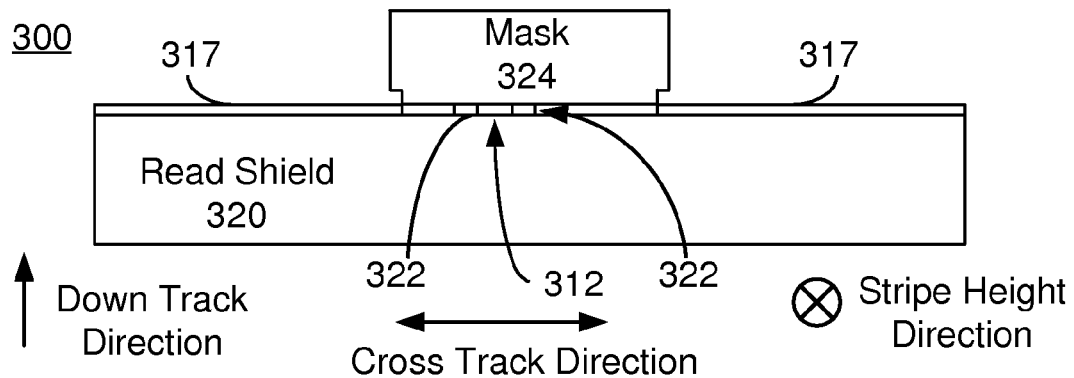
Figure 8B:
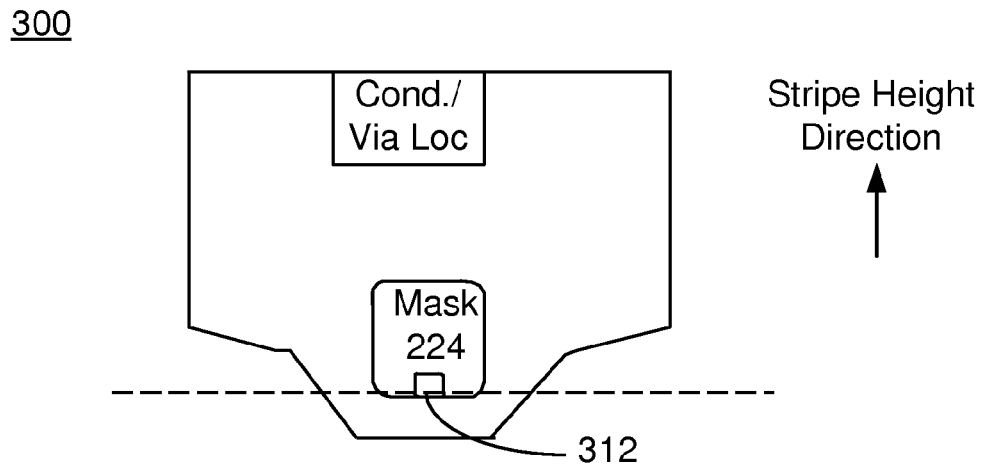

A mask that covers the region around the read sensor 312 is provided and the underlying read shield 320 is partially etched, via step 256. Thus, trenches are formed in the read shield 320. In some embodiments, these trenches are at least one hundred nanometers deep. In other embodiments, the trenches are at least two hundred nanometers deep. However, other depths are possible. Using step 256, the read shield 320 is prepared for formation of the electric gaps. FIGS. 8A and 8B depict ABS and plan views of the transducer 300 during step 255. Thus, the mask 324 covering the read sensor 312 has been formed. In some embodiments, the mask 324 is approximately 5 μm by 5 μm.

Figure 9:
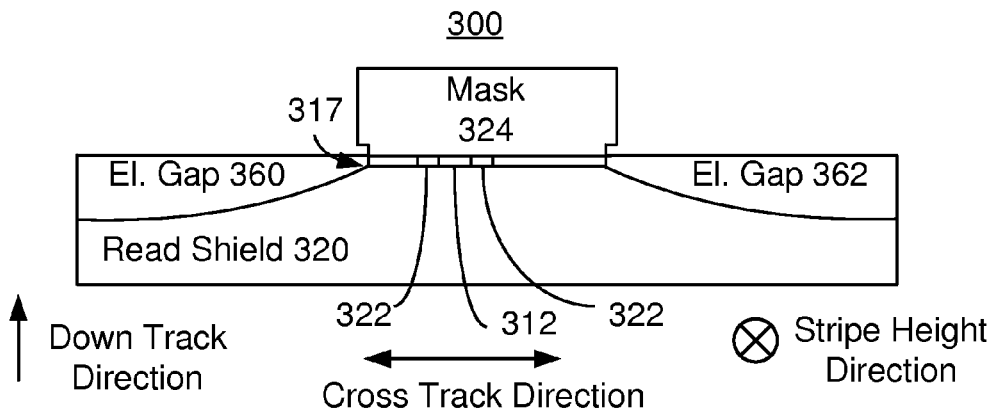

A refill is then performed, via step 258. Consequently, a refill material such as alumina may be deposited to fill in the region of the read shield 320 that was removed in step 256. A light ion mill may also be performed as part of step 258 after the insulator is deposited. Such an ion mill may be used to further planarize the surface. In other embodiments, another process may be used or the ion mill may be omitted. FIG. 9 depicts a side view of the transducer 300 after step 258 is performed. Thus, the insulator has formed electric gaps 360 and 362 having a substantially flat down track surface. Further, a portion of the electric gaps 360 and 362 extend further than the read sensor 312 in a direction opposite to the down track direction. The electric gaps 360 and 362 may be as thick as the trenches are deep. Although not shown, a portion of the insulator may reside on the mask 324.

Figure 10:
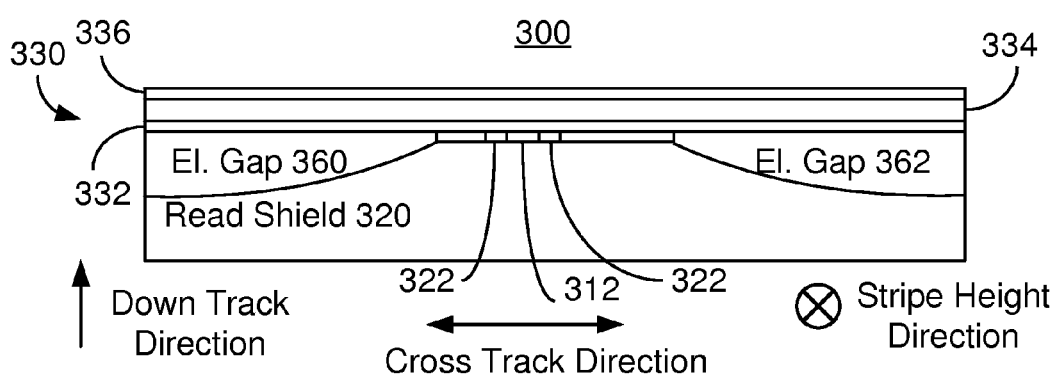
Figure 11:
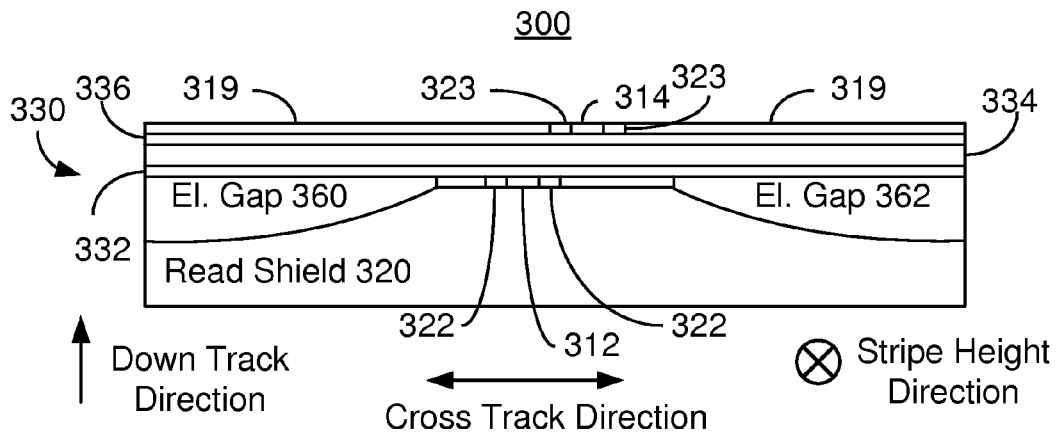

The middle shield is provided on the first read sensor 312, magnetic bias 322, insulator 317 and electric gaps 360 and 362, via step 260. Step 260 may include providing conductive shield layers that are separated by an insulating layer. The conductive shield layers and insulating layer may have sublayers. After formation of the middle shield, a light planarization such as a CMP may optionally be performed, via step 262. Thus, the down track surface of the middle shield may be substantially flat. FIG. 10 depicts an ABS view of the transducer 300 after step 262 is performed. Thus, middle shield 330 has been formed. The middle shield 330 includes shield layers 332 and 336 and insulating layer 334. The shield layers 332 and 336 may be conductive, high permeability layers. the A second read sensor and corresponding magnetic bias structures are provided, via step 264. Step 264 includes full-film depositing the layers for the second read sensor on the middle shield 330 and defining the second read sensor in at least the cross track direction. The magnetic bias structures may be deposited while the second read sensor is covered by a mask. An insulating layer may be provided between the second read sensor and the magnetic bias structures. In addition, another insulator may be provided adjacent to the edges of the magnetic bias structures. These edges are furthest from the second read sensor in the cross track direction. FIG. 11 depicts an ABS view of the transducer 300 after step 264 is performed. Thus, the second read sensor 314 is shown. The second read sensor 314 may be analogous to the first read sensor 312. In the embodiment shown, the sensors 312 and 314 are offset in the cross track direction. In other embodiments, the sensors 312 and 314 might be aligned. Also shown are magnetic bias structures 323 and insulating layers 319. The middle shield 330 is between the first read sensor 312 and the second read sensor 314 in the down track direction.

Figure 12:
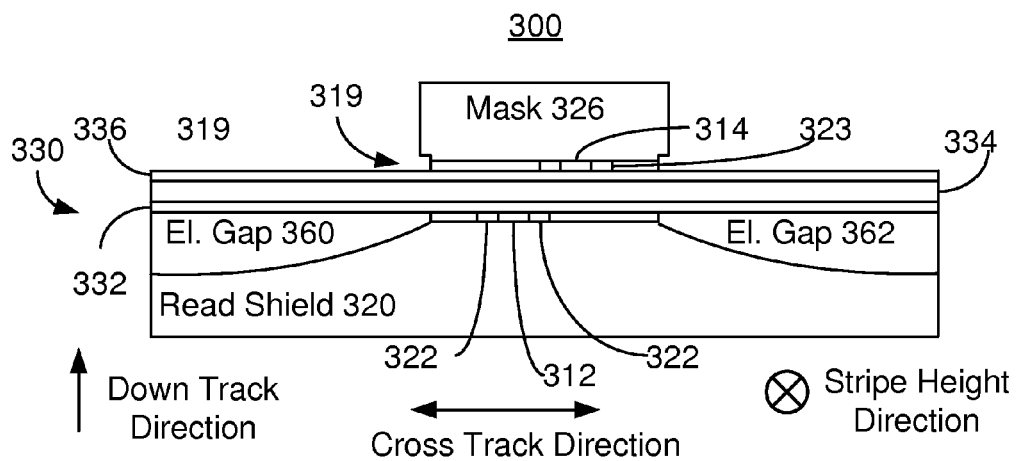
Figure 13:
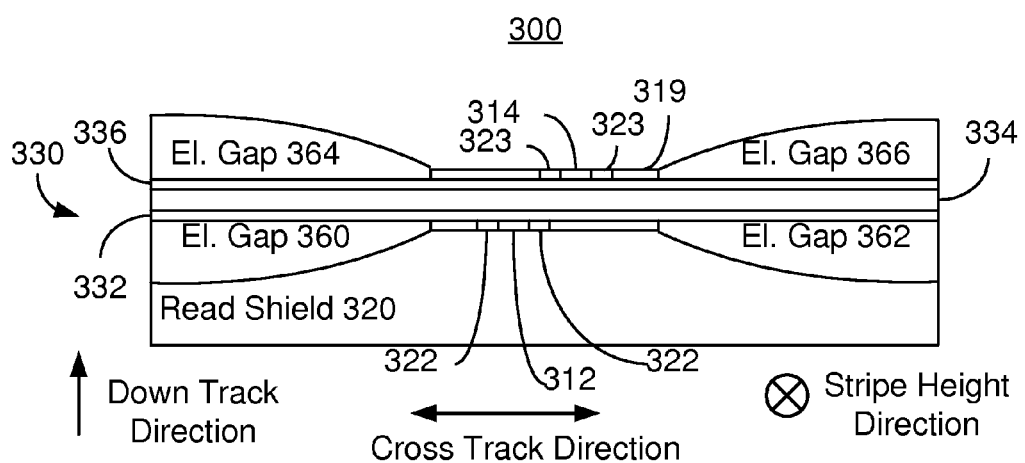

The third and fourth electric gaps are provided, via step 266. This may be accomplished by providing a mask that covers the region around the read sensor 314 and depositing an insulator. For example, a connection to a lower shield may not be provided, but a connection to an upper shield (not shown) may be present. The mask used may be similar to the mask 324 used in forming the electric gaps 360 and 362. FIG. 12 depicts an ABS view of the transducer 300 during step 266. Thus, the mask 326 has been provided. FIG. 13 depicts an ABS view of the transducer 300 after the insulator has been deposited and the mask 326 removed. Thus, electric gaps 364 and 366 have been formed.

Figure 14:
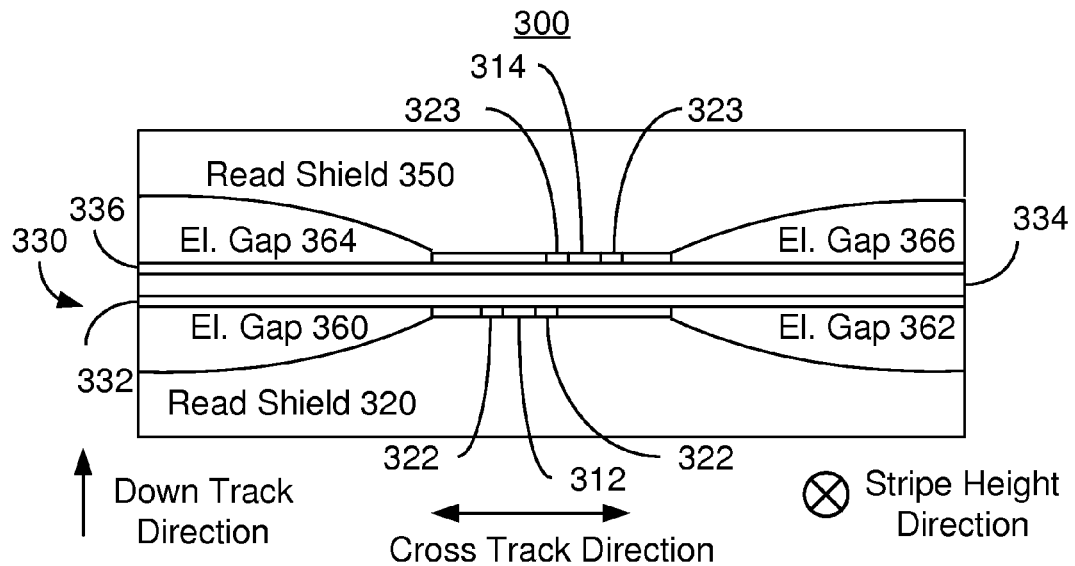

The second read shield is provided, via step 268. Step 268 typically includes depositing (e.g. plating) a large high permeability layer. Fabrication of the transducer may then be completed. The electronics such as preamplifiers for the read sensors may be provided. FIG. 14 depicts an ABS view of the read transducer 300 after step 268 has been completed. Thus, the read shield 350 is shown.

As discussed above, the steps of the method 250 may be performed in another order. For example, the formation of the electric gaps in steps 256 and 258 may be performed before the read sensor and bias structures are formed in step 254. The method 250 is thus also described in the context of FIGS. 15-20, which depict ABS views of an exemplary embodiment of a magnetic transducer 300' during fabrication using the method 250 if the steps 256 and 258 are performed after step 252 but before step 254. Although one transducer 300' is shown, multiple may be fabricated at substantially the same time. The transducer 300' is analogous to the transducer 300. Consequently, the components are labeled similarly.

Figure 15:
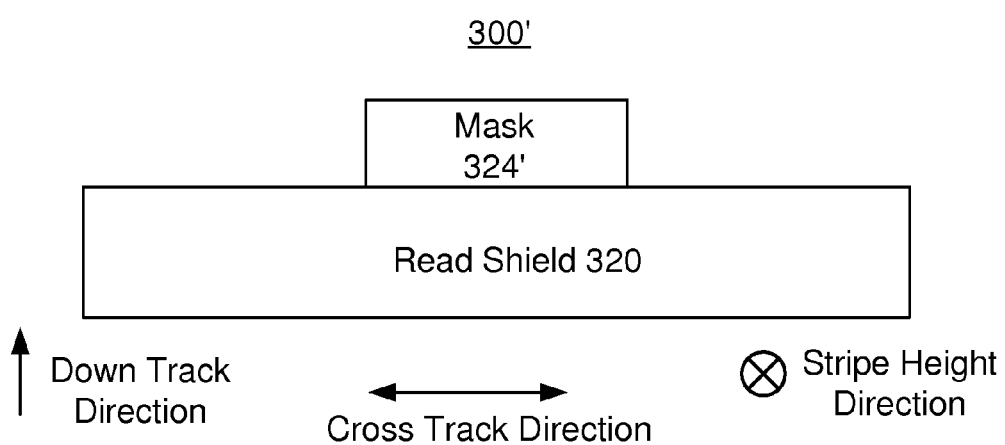
FIGS. 15-20 depict another exemplary embodiment of a portion of a magnetic recording read transducer and disk drive during fabrication.
Figure 16:
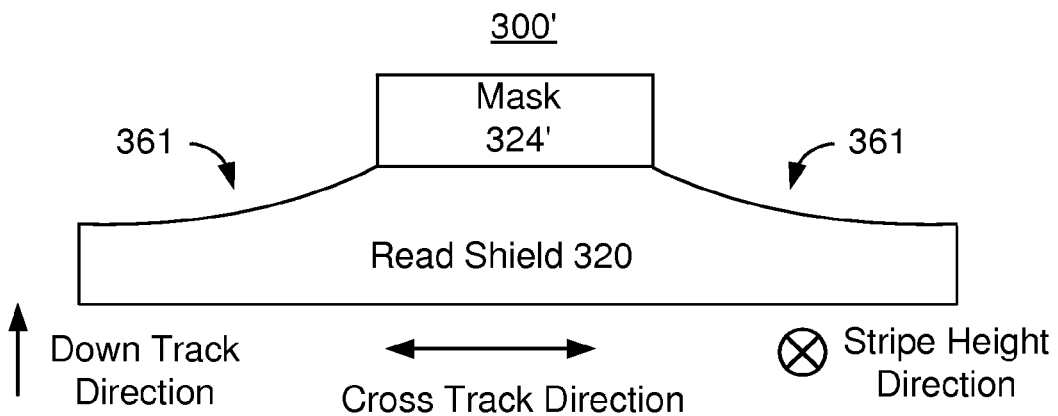
Figure 17:
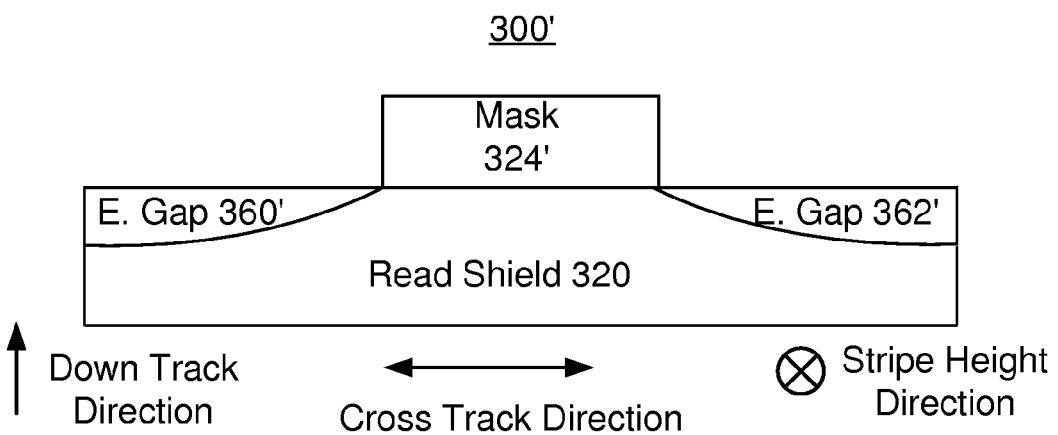

The first read shield 320 is formed in step 252. The sensor region is then masked and the first read shield 320 etched to form trenches. FIG. 15 depicts the transducer during step 256. Thus, a mask 324' is shown on the read shield 320. Note that no read sensor has been formed. FIG. 16 depicts an ABS view of the transducer 300' after step 256 has been completed. Thus, trenches 361 have been formed in the read shield 320. FIG. 17 depicts the transducer 300' after step 258 has been completed. Thus, the gaps 360' and 362' have been formed. In some embodiments, a CMP may be performed after step 258 is performed. This CMP may be instead of or in addition to the CMP on just the read shield 320.

Figure 18:
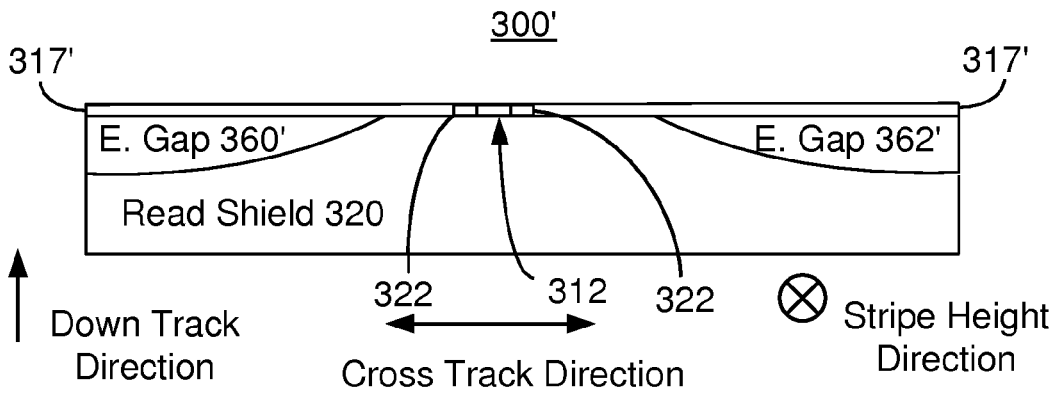
Figure 19:
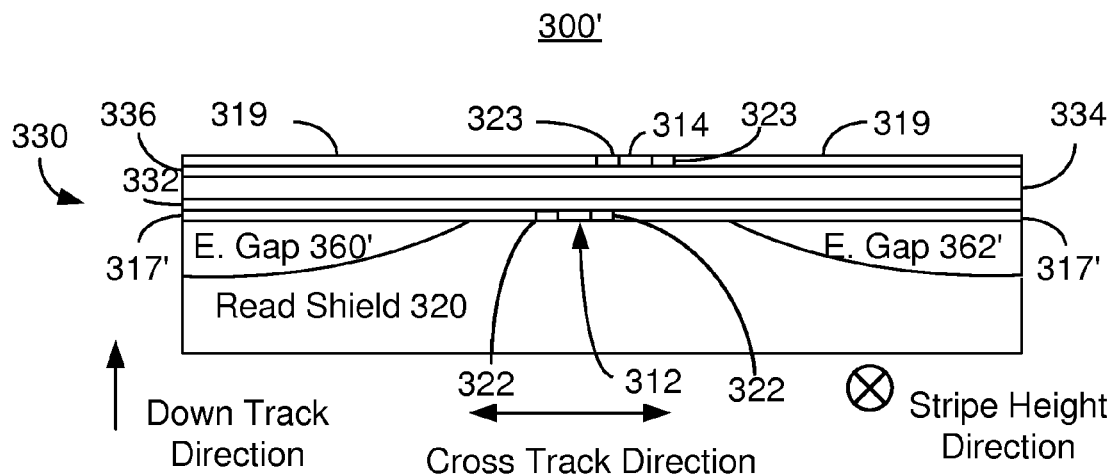

The read sensor and bias structures may then be formed in step 254. FIG. 18 depicts the transducer 300' after step 254 is performed. Thus, read sensor 312, magnetic bias structures 322 and insulating layers 317' are shown. The method 250 may then continue with formation of the middle shield in step 260. A light planarization may optionally be performed and the second read sensor and bias structures formed in steps 262 and 264. FIG. 19 depicts the transducer 300' after step 264 is performed. Thus, middle shield 330 including shield layers 332 and 336 and insulating layer 334 are shown. Also depicted are second read sensor 314, magnetic bias structures 323 and insulating layer 319.

Figure 20:
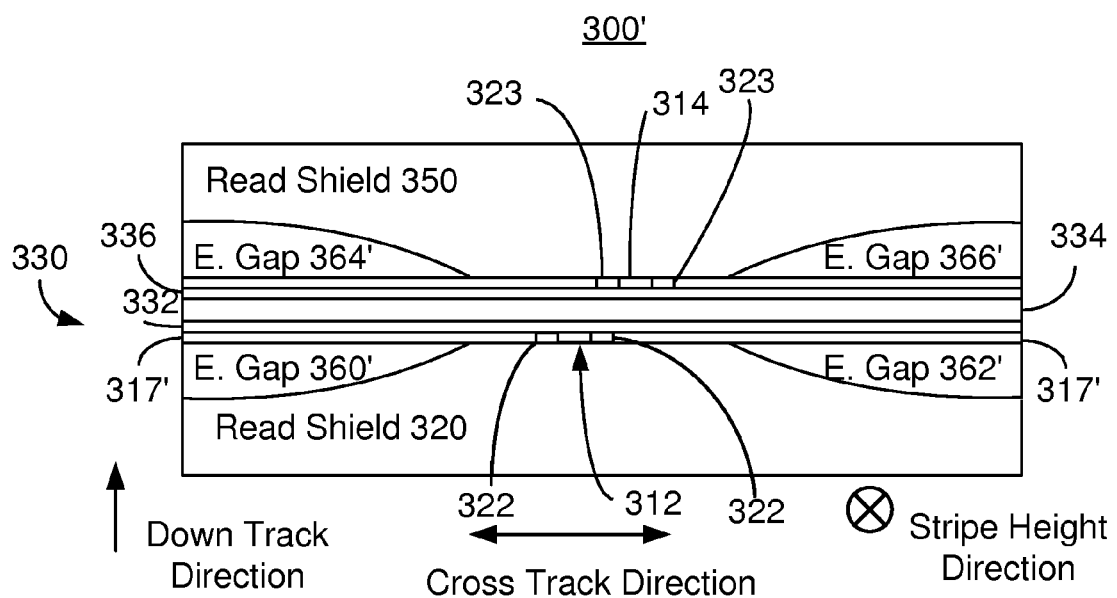

The third and fourth electric gaps may be formed in step 266 as discussed above. An additional read shield may also be provided in step 268. FIG. 20 depicts an ABS view of the transducer 300' after steps 266 and 268 have been completed. Thus, electric gaps 364' and 366' and read shield 350 are shown.

Using the method 250, the magnetic read transducer 300/300' may be provided. Because of the manner in which the electric gaps 360/360' and 362/362' are fabricated, a substantially flat surface is provided for fabrication of the read sensor 314. Processing may thus be simplified. The thickness of the electric gaps 360, 362, 364/364' and 366/366' may be sufficiently large that the capacitances between the sensors 312 and 314 may be reduced. The small distance between the sensors 312 and 314 may be maintained. Consequently, the simplification in processing may not adversely affect performance of the transducer 300/300'. The benefits of the transducers 300 and/or 300' may thus be achieved.

We claim:

1. A magnetic read transducer having an air-bearing surface (ABS) and at least two read sensors comprising:
   a first read shield;
   a first read sensor residing in a down track direction from the first read shield;
   a middle shield residing in a down track direction from the first read sensor;
   a second read sensor, the middle shield residing between the first read sensor and the second read sensor;
   a first electric gap, a first portion of the first electric gap residing in a direction opposite to the down track direction from the first read sensor; and
   a second electric gap, the first read sensor and the second read sensor being between the first electric gap and the second electric gap in a cross-track direction.

2. The magnetic read transducer of claim 1 wherein the first electric gap includes a second portion residing in a down track direction from the second read sensor.

3. The magnetic read transducer of claim 1 wherein a first portion of the second electric gap is in a direction opposite to the down track direction from the first read sensor and a second portion of the second electric gap is in a down track direction from the second read sensor.

4. The magnetic read transducer of claim 3 wherein the first portion of the second electric gap and the first portion of the first electric gap each has a thickness in the down track direction of at least 150 nm.

5. The magnetic read transducer of claim 4 wherein the second portion of the first electric gap and the second portion of the second electric gap each has an additional thickness in the down track direction of at least 150 nm.

6. The magnetic read transducer of claim 1 wherein the middle shield further includes a first shield layer, an insulating layer and a second shield layer, the first shield layer and the second shield layer being conductive, the insulating layer being between the first shield layer and the second shield layer in the down track direction.

7. The magnetic read transducer of claim 1 further comprising:
   a first magnetic bias structure for the first read sensor, the first magnetic bias structure being between the first electric gap and the second electric gap; and
   a second magnetic bias structure for the second read sensor, the second magnetic bias structure being between the first electric gap and the second electric gap.

8. The magnetic read transducer of claim 1 wherein the first read sensor includes a first center line, the second read sensor includes a second center line and wherein a distance in the cross-track direction is between the first center line and the second center line.

9. The magnetic read transducer of claim 1 further comprising:
   a second read shield, the first read sensor, the middle shield and the second read sensor being between the first read shield and the second read shield in the down track direction.

10. A magnetic disk drive comprising:
    a slider;
    a read transducer having an air-bearing surface (ABS) the read transducer including a first read shield, a first read sensor residing in a down track direction from the first read shield, a middle shield residing in a down track direction from the first read sensor, a second read sensor, a first electric gap and a second electric gap, the middle shield residing between the first read sensor and the second read sensor in the down track direction, a first portion of the first electric gap residing in a direction opposite to the down track direction from the first read sensor, the first read sensor and the second read sensor being between the first electric gap and the second electric gap in a cross-track direction.

11. The disk drive of claim 10 wherein the first electric gap further includes a second portion residing in a down track direction from the second read sensor.

12. The disk drive of claim 10 wherein a first portion of the second electric gap is in a direction opposite to the down track direction from the first read sensor and a second portion of the second electric gap is in a down track direction from the second read sensor.

13. A method for providing a magnetic read transducer having an air-bearing surface (ABS) and at least two read sensors, the method comprising:
- providing a first read shield;
- providing a first read sensor residing in a down track direction from the first read shield;
- providing a middle shield residing in a down track direction from the first read sensor;
- providing a second read sensor, the middle shield residing between the first read sensor and the second read sensor;
- providing a first electric gap and a second electric gap, a first portion of the first electric gap residing in a direction opposite to the down track direction from the first read sensor; a second portion of the first electric gap residing in a down track direction from the second read sensor.

14. The method of claim 13 wherein the step of providing the first electric gap and the second electric gap further includes:
- providing a second portion of the first electric gap residing in a down track direction from the second read sensor.

15. The method of claim 13 wherein a first portion of the second electric gap is in a direction opposite to the down track direction from the first read sensor and a second portion of the second electric gap is in a down track direction from the second read sensor.

16. The method of claim 13 wherein the step of providing the first electric gap and the second electric gap further includes:
- providing a mask covering a region of the first read shield, the region including a portion in the direction opposite to the down track direction from the first read sensor;
- removing a portion of the first read shield exposed by the mask;
- depositing at least one insulating material; and
- removing the mask.

17. The method of claim 16 wherein the steps of providing the mask, removing the portion of the first read shield, depositing the at least one insulating material and removing the mask are performed before the step of providing the first read sensor.

18. The method of claim 16 wherein the steps of providing the mask, removing the portion of the first read shield, depositing the at least one insulating material and removing the mask are performed after the step of providing the first read sensor.

19. The method of claim 13 wherein the step of providing the middle shield further includes:
- providing a first shield layer;
- providing an insulating layer; and
- providing a second shield layer, the first shield layer and the second shield layer being conductive, the insulating layer being between the first shield layer and the second shield layer in the down track direction.

20. The method of claim 13 further comprising:
- providing a first magnetic bias structure for the first read sensor, the first magnetic bias structure being between the first electric gap and the second electric gap; and
- providing a second magnetic bias structure for the second read sensor, the second magnetic bias structure being between the first electric gap and the second electric gap.

21. The method of claim 13 wherein the first read sensor includes a first center line, the second read sensor includes a second center line and wherein a distance in the cross-track direction is between the first center line and the second center line.

22. The method of claim 13 further comprising:
- providing a second read shield, the first read sensor, shield and second read sensor being between the first read shield and the second read shield in the down track direction.

* * * * *